(12) United States Patent
Wu

(10) Patent No.: US 6,676,052 B2
(45) Date of Patent: Jan. 13, 2004

(54) PEPPER GRINDING TOOL WITH A SIDEWAYS LEVER OPERATED WITH ONE HAND

(75) Inventor: Hua-Te Wu, Tainan (TW)

(73) Assignee: Yienn Lih Enterprise Co., Ltd., Tainan (TW)

(*) Notice: Subject to any disclaimer, the term of this patent is extended or adjusted under 35 U.S.C. 154(b) by 0 days.

(21) Appl. No.: 09/948,911

(22) Filed: Sep. 10, 2001

(65) Prior Publication Data

US 2003/0047630 A1 Mar. 13, 2003

(51) Int. Cl.$^7$ ................................................ A47J 42/04
(52) U.S. Cl. ...................................................... 241/169.1
(58) Field of Search ................................ 241/168, 169, 241/169.1

(56) References Cited

U.S. PATENT DOCUMENTS 4,509,698 A * 4/1985 David ...................... 241/169.1
5,082,190 A * 1/1992 Chen ........................ 241/169.1

* cited by examiner

*Primary Examiner*—Mark Rosenbaum
(74) *Attorney, Agent, or Firm*—Rosenberg, Klein & Lee

(57) ABSTRACT

A pepper grinding tool with a sideways projecting lever operated with a single hand includes a housing consisting of both an upper part and a lower part, a lever, a grinding assembly and an one-way member. The housing has a first portion and a second elongated portion projecting sideways from the first portion and having a lateral opening. The lever has teeth on a front end, and is pivoted to the elongated portion with the teeth facing the first portion and with a rear portion being biased outwardly of the lateral opening by a spring. The one-way member is turnably received in the first portion of the housing, and has a toothed round part abutting the teeth of the lever. The main body is connected to a shaft, of which the lower end is connected to an inner grinding part of the grinding assembly, in such a way that the shaft can turn together with the round part only when the lever rear portion is pivoted outwardly of the opening to force the toothed round part to turn clockwise, i.e. when the user pushes the lever rear portion into the opening and releases the same repeatedly, the inner grinding element is turned clockwise so as to grind pepper distributed between the same and an outer grinding element, which is fixedly received in the first portion of the housing and mounted on the inner grinding element.

9 Claims, 4 Drawing Sheets

PEPPER GRINDING TOOL WITH A SIDEWAYS LEVER OPERATED WITH ONE HAND

BACKGROUND OF THE INVENTION

The present invention relates to a pepper grinding tool, and more particularly, to a pepper grinding tool which has a sideways projecting lever capable of being operated with one hand for grinding the pepper.

Referring to FIG. 5, a conventional pepper grinding tool includes a main body 10, a turnable member 20 turnably arranged on the main body 10, and a grinding assembly 30 received in the main body 10 and connected to the turnable member 20. The user holds the main body 10 with one hand, and turns the turnable member 20 with the other so as to grind the pepper received in the grinding assembly 30. However, the user doesn't have a free hand to do other actions while using such tool to grind pepper because he/she has to hold the main body 10 with one end and turn the turnable member 20 with the other, therefore such tool would cause the user in the kitchen inconvenience.

To overcome this disadvantage, several pepper grinding tools have been proposed that can be operated with a single hand. Such tools are disclosed in U.S. Pat. No. 4,697,749, and in U.S. Pat. Nos. 5,730,374 and 5,988,543, which disclose earlier improvements made by the inventor of the present invention.

However, all of the above mentioned tools operated with a single hand are upright when they are used, and have relatively complicated structure. No pepper grinding tool operated with a single hand is provided with a laid-down in-use position.

SUMMARY OF THE INVENTION

Therefore, it is a main object of the present invention to provide a pepper grinding tool, which can be operated for grinding pepper with a single hand and is at a laid-down position when it is used.

The pepper grinding tool includes a housing consisting of both an upper part and a lower part, a lever, a grinding assembly and an one-way member.

The housing parts each has a first portion and a second elongated portions projecting sideways from the first portions. The elongated portions have a lateral opening formed therebetween.

The lever has teeth on a front end facing the first portions, and is pivoted to front portions of the elongated portions at an intermediate portion with a rear portion being biased outwardly of the lateral opening by a first spring.

The one-way member has a round main body which is turnably received in the first portions of the housing, and has teeth on an outer side abutting the teeth of the lever. The main body is connected to a shaft in such a way as to not turn the shaft together with it when the lever is pushed inwardly of the second portions to force the main body to turn counterclockwise, and to be capable of turning the shaft together with the main body when the main body is turned clockwise.

The grinding assembly includes an outer grinding element secured in the second portion of the lower housing part, and an inner grinding element, which is turnably received in the outer element and connected to the lower end of the shaft. Thus, the inner element can be turned relative to the outer element to grind pepper therebetween when the lever is pushed inwardly of the second portion and released repeatedly.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
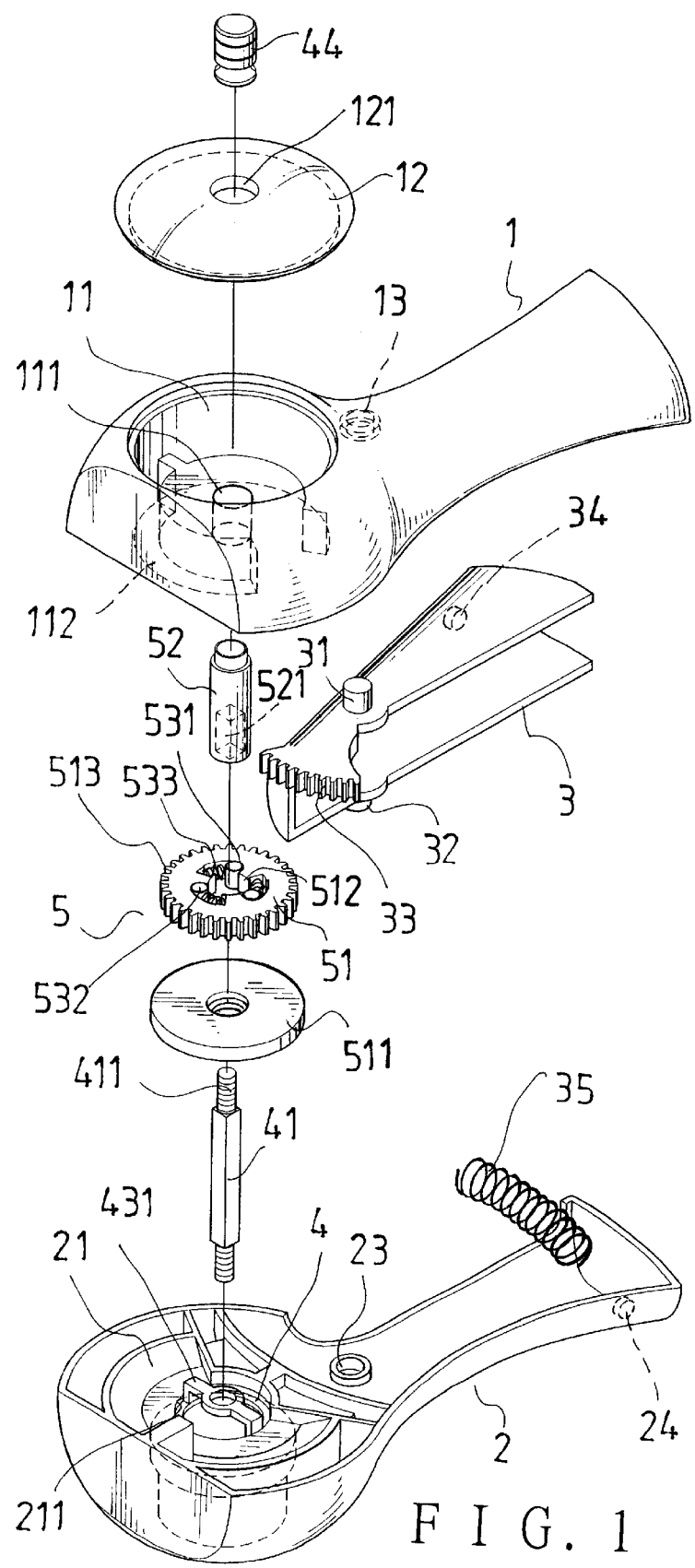
FIG. 1 is an exploded perspective view of the pepper grinding tool of the present invention.
Figure 2:
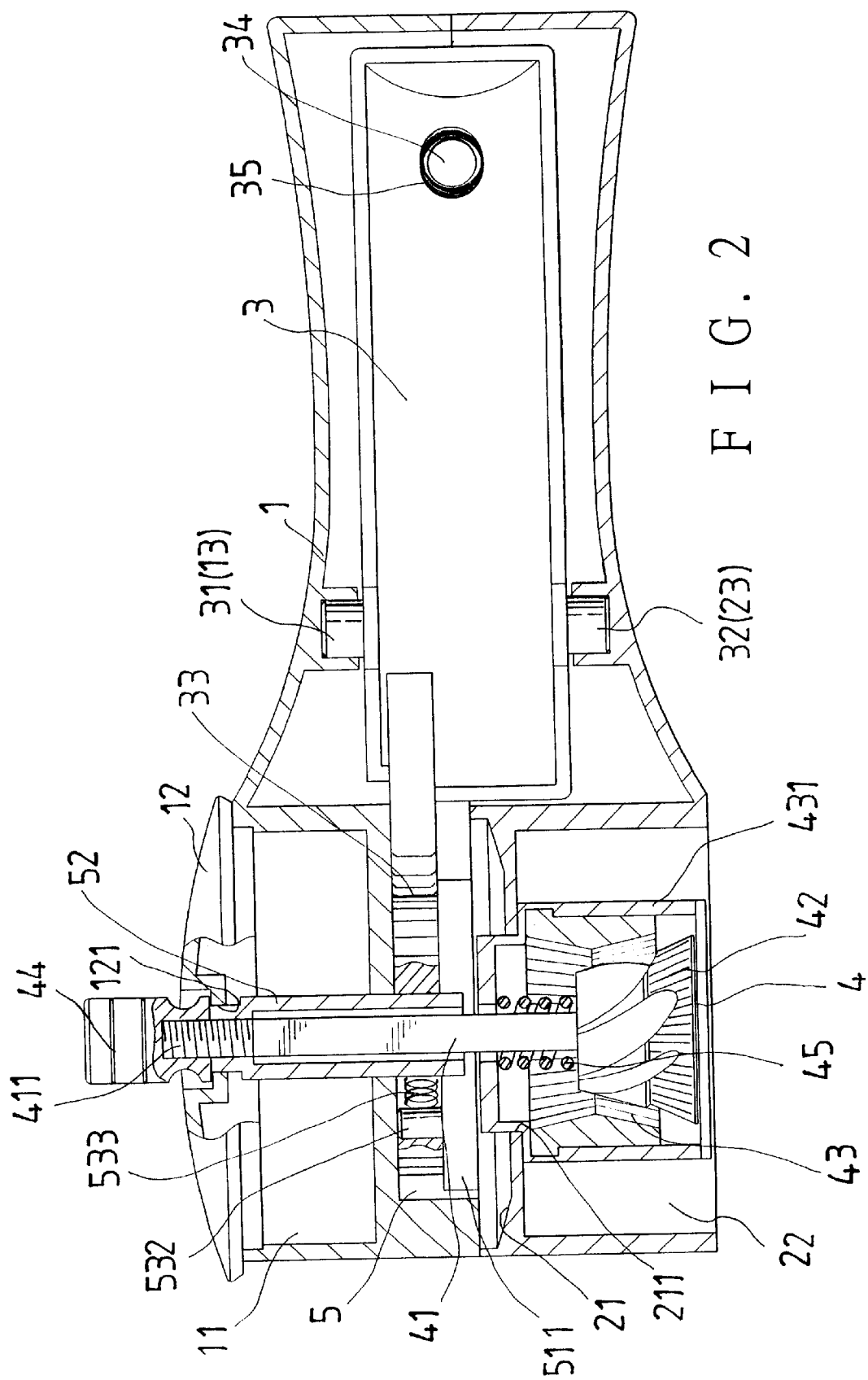
FIG. 2 is a cross-sectional view of the pepper grinding tool of the present invention.

Referring to FIGS. 1 and 2, a pepper grinding tool of the present invention includes an upper housing part 1, a lower housing part 2, a lever 3, a grinding assembly 4 and an one-way member 5.

The upper housing part 1 includes a first portion, and a second elongated portion projecting sideways from the first portion. The first portion has a holding room 11 having a central hole 111, and curved holes 112 for adding pepper through. A cover 12 is removably fitted onto the top of the holding room 11; the cover 12 has a through hole 121 on the center. The second elongated portion of the upper housing part 1 has a pivotal socket 13 at a front end close to the first portion, and a lateral opening (not numbered) lengthwise formed thereon.

The lower housing part 2 has a contour similar to the upper housing part 1, including a first portion and a second elongated portion. The first portion of the lower part 2 has a sloping pepper adding area 21 in the upper part, a through hole 211 at the middle of the area 21, and a holding chamber 22 in the lower part 2, which communicate with the pepper adding area 21 via the through holes 211. The elongated portion of the lower part 2 has a pivotal socket 23 at a front end close to the first portion, and a lateral opening (not numbered) lengthwise formed thereon, and a first positioning protrusion 24 formed at the rear end portion and opposite the lateral opening. The lower part 2 is joined to the upper part 1 with the openings of both forming a complete opening.

The control lever 3 has teeth 33 on the front end, a pivotal pole 31 on the upper side, a pivotal pole 32 aligned with the upper pole 31 on the lower side, and a second positioning protrusion 34 formed at the rear end portion. The lever 3 is pivotably received in the combined housing parts 1 and 2 with the upper pole 31 being inserted into the socket 13 of the upper housing part 1 and with the lower pole 32 being inserted into the socket 23 of the lower housing part 2; a spring 35 is connected to the first and the second positioning protrusions 24 and 34 from two ends. Thus, a user can pivot the lever 3 on the combined housing parts repeatedly by means of pushing the lever 3 inwardly of the elongated portions from the complete opening and releasing the same after the pushing action to allow the spring 35 to bias the lever 3 outwardly of the combined housing parts.

The one-way member 5 includes a main body 51 and a base part 511. The main body 51 is round, and has teeth 513 on the outer side, a round hole 512 at the center, several curved slots (not numbered) around the round hole; the curved slots each has an engaging end portion 531 communicating with the central round hole from the inner side, and each receives a spring 533 and an engaging block 532; the spring 533 is connected to the curved slot from one end, and connected to the related engaging block 532 from the other end so as to bias the block 532 onto the engaging end portion 531. The base part 511 has a central hole (not numbered) aligned with the round hole when it is positioned under the main body 51. The one-way member 5 is turnably received in the combined housing parts with the teeth 513 engaging the teeth 33 of the lever 3.

A sleeve 52 is passed through the round hole of the main body 51; the sleeve 52 is formed with a polygonal hole 521.

The grinding assembly 4 includes a shaft 41, an inner grinding element 42 and an outer grinding element 43. The inner grinding element 42 is turnably connected to the outer element 43 for grinding pepper therebetween. The outer grinding member 43 is secured in a securing member 431, and the securing member 431 is fixedly received in the holding chamber 22 of the lower housing part 2. The securing member 431 has a central hole (not numbered) aligned with the round hole of the main body 51 of the one-way member 5.

A shaft 41 is connected to a knob 44 positioned on the top of the cover 12 from an upper threaded end portion 411, and passed through the through hole 121, the central hole 111, the polygonal hole 521, the round hole of the main body 51, the central hole of the base part 511, and the central hole of the securing member 431. The shaft 41 is further connected to the inner grinding element 42 from a lower threaded end portion. The shaft 41 is formed with a polygonal section at the middle part such that it can be turned together with the sleeve 52 due to the connection of the same with the polygonal bole 521 of the sleeve 52.

Figure 3:
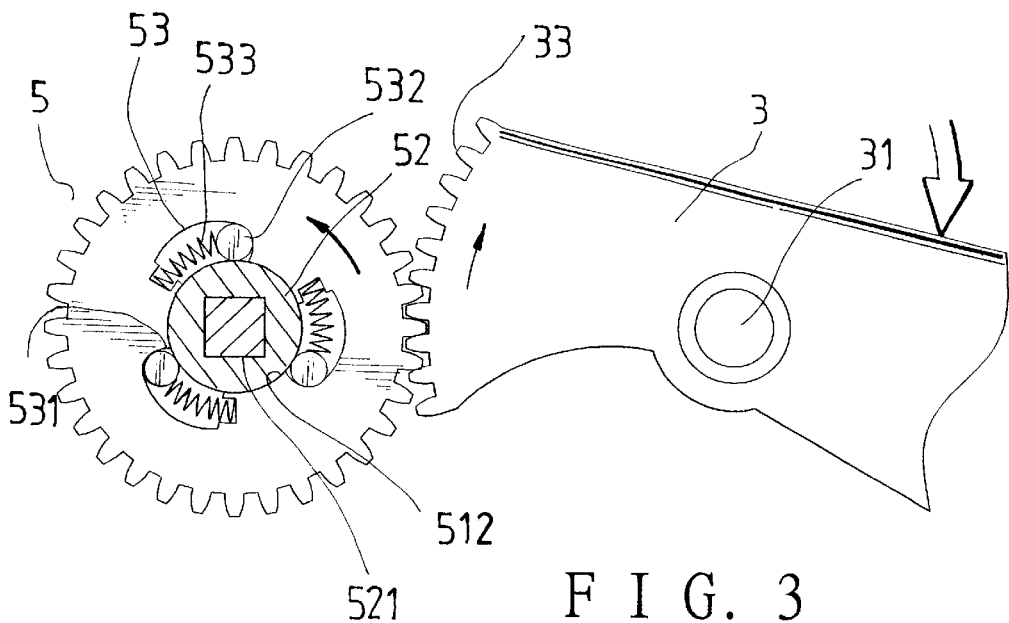
FIG. 3 is a top view of the one-way member according to the present invention in the engaging position.
Figure 4:
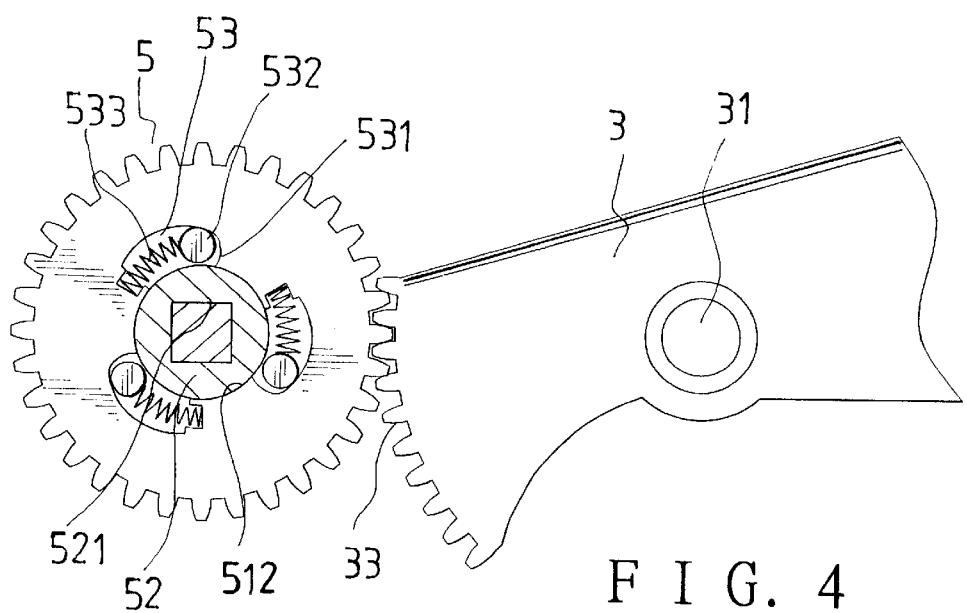
FIG. 4 is a top view of the one-way member according to the present invention in the unlocking position.
Figure 5:
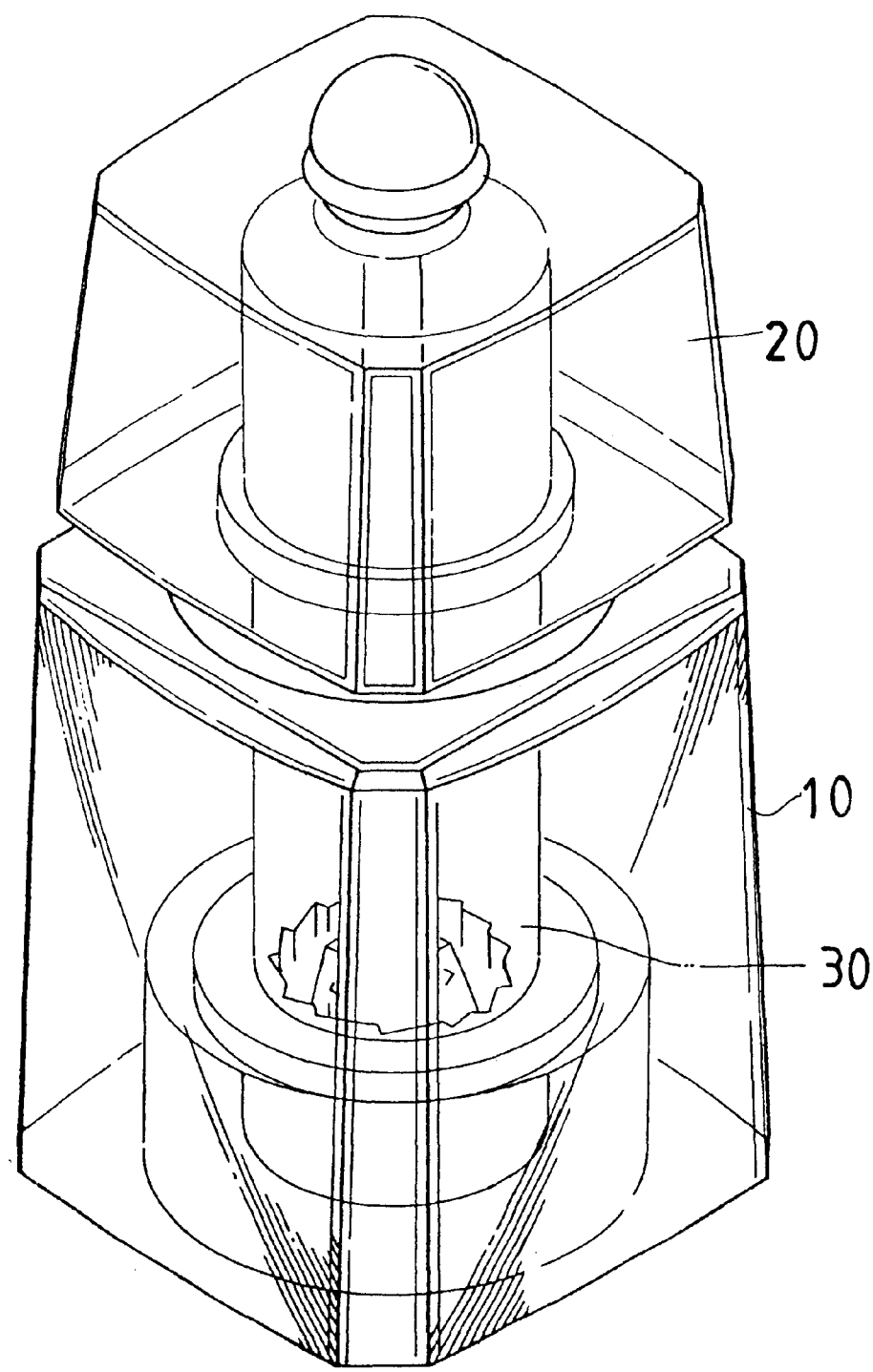
FIG. 5 is a perspective view of the conventional pepper grinding tool as described in the Background.

In addition, when the main body 51 turns clockwise as shown in FIG. 3, the engaging blocks 532 are biased to the engaging end portions 531 by the springs 533 so as to engage the sleeve 52; when the main body 51 turns in the opposite direction, the curved slots with force as engaging blocks 532 to separate from the engaging end portions 531 as shown in FIG. 4 so as to disengage the sleeve 52. Thus, in using the pepper grinding tool, when the lever 3 is pushed inwardly of the combined housing parts, the main body 51 of the one-way member 5 is turned counterclockwise, and the sleeve 52 doesn't turn because the engaging blocks 532 are disengaged from the sleeve 52. When the lever 3 is released from the pushed position to be biased outwardly of the housing parts by the spring 35, the main body 51 is turned clockwise, therefore both the inner grinding element 42 and the shaft 41 are turned together with the sleeve 52. Thus, pepper between inner and the outer grinding elements 42 and 43 are ground into particulates.

Moreover, referring to FIG. 2 again, a spring 45 is positioned around the shaft 41 and between the upper part of the securing member 431 and the inner grinding element 42 such that the user can adjust the height of inner grinding element 42 relative to the outer element 43 for controlling the fineness of the ground pepper by means of the turning the knob 44.

From the above description, we can easily see that the user can operate the pepper grinding tool with a single hand of the user, holding the elongated portions of the housing parts and pushing and releasing the lever 3 repeatedly. And, the pepper grinding tool has relatively uncomplicated structure as compared with the conventional ones, and the assembly is simpler.

What is claimed is:

1. A pepper grinding tool with a sideways lever operated with one hand, comprising:

a housing including an upper housing part and a lower housing part joined to said upper housing part; said housing parts each having a first portion and a second elongated portion projecting sideways from said first portion; said second portions of said housing parts forming a lateral opening therebetween;

a lever having teeth on a front end facing said first portions; said lever being pivoted to front portions of said second portions at an intermediate portion with a rear portion being biased outwardly of said lateral opening of said housing by a first spring connected to both said lever and said second portions;

a one-way member received in angularly displaceable manner in said first portions of said housing; said one-way member having a round main body having teeth on an outer side abutting said teeth of said lever;

said main body being connected in selectively engaged manner to a shaft, said main body being engaged with said shaft for angular displacement therewith in a first direction responsive to said lever being pushed inwardly of said second portions, said main body being disengaged from said shaft for angular displacement relative thereto in a second direction opposing said first direction responsive to said lever being reversibly displaced from said pushed position;

a grinding assembly including an outer grinding element secured in said second portion of said lower housing part, and an inner grinding element received in angularly displaceable manner in said outer grinding element; said inner element being connected to a lower end of said shaft so as to turn relative to said outer grinding element to grind pepper therebetween when said lever is pushed inwardly of the second portions of the housing and released repeatedly.

2. The pepper grinding tool with a sideways lever operated with one hand as claimed in claim 1, wherein said first portion of said upper housing part includes a central hole and a plurality of pepper adding holes in a holding room thereof, and said first portion of said lower housing part includes a sloping pepper adding area at an upper part communicating with said pepper adding holes of said upper housing part, and a holding chamber in a lower part; said sloping area defining a plurality of through holes formed therebetween so as to communicate with said holding chamber via said through holes; said grinding assembly being secured in said holding chamber for allowing pepper to pass thereinto via said sloping area and said through holes when said pepper is added into said pepper adding holes of said upper housing part; said upper housing part having a cover arranged above said holding room and removably connected to an upper threaded portion of said shaft.

3. The pepper grinding tool with a sideways lever operated with one hand as claimed in claim 1, wherein said lever has two opposing pivotal poles on an upper and a lower sides respectively, and said second portions of said upper and said lower housing parts each has a pivotal sockets; said pivotal poles being each passed into one of said sockets for allowing said lever to pivot on said second portions.

4. The pepper grinding tool with a sideways lever operated with one hand as claimed in claim 1, wherein said second portion of said lower housing part includes a first positioning protrusion at a rear part, and said lever has a second positioning protrusion opposing said first positioning protrusion; said first spring being mounted on said first and said second protrusions from two ends.

5. The pepper grinding tool with a sideways lever operated with one hand as claimed in claim 1, wherein said shaft is connected to a cover and a nut from an upper threaded portion; said nut being positioned on top of said cover; said cover being arranged above said holding room of said upper housing part.

6. The pepper grinding tool with a sideways lever operated with one hand as claimed in claim 1, wherein said outer grinding element is held in position by a securing member secured in said first portion of said lower housing part.

7. The pepper grinding tool with a sideways lever operated with one hand as claimed in claim 6 wherein said shaft is passed through a second spring positioned between said securing member and said inner grinding element.

8. The pepper grinding tool with a sideways lever operated with one hand as claimed in claim 1, wherein said one-way member has a holed base part positioned between a bottom of said main body and said first portion of said lower housing part.

9. The pepper grinding tool with a sideways lever operated with one hand as claimed in claim 1, wherein said shaft has a polygonal section, and is passed through a sleeve with polygonal hole, and said main body of said one-way member has a central round hole, and a plurality of curved slots each having an engaging end portion communicating with said central round hole; said sleeve being passed through said central round hole; said curved slots each receiving an engaging block biased to said engaging end portion by a spring to engage said sleeve when said main body is turned in said second direction; said engaging blocks being moved in such a way as to separate from said sleeve when said main body is turned in said first direction.

* * * * *